(12) United States Patent
Stolfo

(10) Patent No.: US 10,891,375 B1
(45) Date of Patent: Jan. 12, 2021

(54) DOCUMENT BEHAVIOR ANALYTICS—ABNORMAL DOCUMENT FLOWS TO IDENTIFY SUSPICIOUS EXFILTRATION UTILITY PATENT

(71) Applicant: Salvatore J Stolfo, New York, NY (US)

(72) Inventor: Salvatore J Stolfo, New York, NY (US)

(73) Assignee: Allure Security Technology Inc., Waltham, MA (US)

(*) Notice: Subject to any disclaimer, the term of this patent is extended or adjusted under 35 U.S.C. 154(b) by 301 days.

(21) Appl. No.: 16/144,844

(22) Filed: Sep. 27, 2018

Related U.S. Application Data

(60) Provisional application No. 62/563,953, filed on Sep. 27, 2017.

(51) Int. Cl.
| | |
|---|---|
| G06F 11/00 | (2006.01) |
| G06F 21/56 | (2013.01) |
| G06F 21/55 | (2013.01) |
| G06F 16/245 | (2019.01) |
| G06F 16/248 | (2019.01) |
| G06F 12/14 | (2006.01) |

(52) U.S. Cl.
CPC .......... G06F 21/56 (2013.01); G06F 16/245 (2019.01); G06F 16/248 (2019.01); G06F 21/55 (2013.01)

(58) Field of Classification Search
CPC .... G06F 16/35; G06F 16/367; G06F 17/2715; G06F 17/274; G06F 17/277; G06F 17/2785; G06F 40/216; G06F 40/253; G06F 40/284; G06F 40/30
See application file for complete search history.

(56) References Cited

U.S. PATENT DOCUMENTS

| | | | | |
|---|---|---|---|---|
| 10,009,184 | B1* | 6/2018 | Baldwin | H04L 9/0891 |
| 2008/0005024 | A1* | 1/2008 | Kirkwood | G06Q 40/00 705/50 |
| 2009/0319345 | A1* | 12/2009 | Lin | G06Q 10/0639 705/7.38 |
| 2010/0007917 | A1* | 1/2010 | Webster | G06F 3/1275 358/1.15 |
| 2012/0036577 | A1* | 2/2012 | Bolzoni | H04L 63/1408 726/23 |
| 2012/0216290 | A1* | 8/2012 | Roy | G06F 21/10 726/27 |
| 2015/0081553 | A1* | 3/2015 | Smith | G06Q 20/023 705/44 |
| 2016/0179868 | A1* | 6/2016 | Rajpathak | G06F 40/284 707/690 |

\* cited by examiner

*Primary Examiner* — Gary S Gracia
(74) *Attorney, Agent, or Firm* — Kelley Drye & Warren LLP

(57) ABSTRACT

Systems and methods for efficiently detecting and monitoring transmitted documents. The invention provides efficient, scalable, and accurate means to identify anomalous or suspicious access patterns, and related and similar documents based upon their content and their structural characteristics. Transmitted documents that are encrypted may be monitored without revealing the encrypted information.

1 Claim, 4 Drawing Sheets

DOCUMENT BEHAVIOR ANALYTICS—ABNORMAL DOCUMENT FLOWS TO IDENTIFY SUSPICIOUS EXFILTRATION UTILITY PATENT

CROSS REFERENCE TO RELATED APPLICATION

This application claims the benefit of U.S. Provisional Application No. 62/563,953, filed Sep. 27, 2017. The entire contents of that application are incorporated herein by reference.

FIELD OF THE INVENTION

This invention relates to the field of information security and monitoring.

BACKGROUND OF THE INVENTION

Prior work in computer security research has focused on automated statistical learning approaches to efficiently train models of content and user behavior for a site's "normal" email traffic flow without requiring significant semantic analysis of the content of messages. Systems might be designed to automatically learn the characteristics of "normal" document flows in an organization for any user, application, service, network or host, and to efficiently and accurately identify related documents in that flow. The systems are intended to detect unusual document flows that may represent a policy violation.

Prior research has also considered the problem of identifying similar "things" in large collections of items. In particular, seminal work has been done in clustering all HTML documents of the entire World Wide Web [12]. In that work, documents are converted into "sketches" in much the same fashion as described herein. A form of n-gram analysis is performed whereby Rabin fingerprints [13] are extracted from arbitrary documents, and similarity and containment measures of documents are computed by comparing the overlap of the corresponding fingerprints. The similarity measure serves as a metric for use in clustering.

It is crucial, however, that the methods deal with a number of important desiderata, accuracy in identifying documents that are substantially similar in content or that share significant content, privacy of the document content when in transit including its structural properties, and scale to adequately manage and organize information flows within a large organization. It is important to note that for some environments, such technology is important to employ server side and in other environments it is important to employ client side.

SUMMARY OF THE INVENTION

The present invention is directed to efficient and effective monitoring systems for document flows spanning, for example, emails, file systems, and cloud storage. Even documents that are encrypted in transit may be monitored. An individual document may be logically represented with a unique document identifier, optionally the name of the file object storing the document. A similarity analysis may be implemented by a privacy-preserving Bloom filter representation of document content, specifically language independent byte-value n-grams in its description, allowing for the detection of similar documents across a set of documents of interest, even for encrypted documents. The properties of this privacy preserving similarity analysis support cross domain correlation for determination of document similarity without forcing sharing of unencrypted readable data ("cleartext") between domains.

The present invention may incorporate one or more machine learning analytic techniques for identifying normal, anomalous, and suspicious patterns of document flows. Without loss of generality, a Probabilistic Anomaly Detector may be employed to conduct a document flow audit function (380) on document flow audit data to identify anomalous flows. Document flow audit data, represented by "Doc Flows" database (305) in the accompanying FIG. 3, may reflect a document's source IP address, destination IP address, document type, creation date, InitiDocument identifier, document Identifier, and/or size, whether the document is a decoy, and other additional information about the document that may be pertinent to model document flows, for example, to identify a potential security violation.

It is an object of the present invention to provide a system that allows for document flow analysis as disclosed herein, including the ability to identify similar documents without requiring all text to be exposed. The text will always be retrievable from the document identifiers when pursuing clearly identified risks, but the present approach aids scaling across distrustful security domains by eliminating the need to expose all cleartext in a single compartment for correlation, even if the correlation is for counter intelligence purposes.

It is a goal of the present invention to allow efficient auditing of documents transmitted from and to an organization.

It is a further goal of the present invention to provide automated analysis for detecting and discovering unusual or errant document flow behaviors indicative of risk or policy violations.

It also a goal of the present invention to provide automated detection of risk or policy violations by monitoring for decoy documents, i.e., bogus but realistic looking documents, that may be planted throughout an enterprise in data storage facilities, including endpoint file systems or shared/distributed and cloud storage systems.

In addition, it is the goal of the present invention to provide automated detection of risk or policy violations by monitoring for beacon alerts associated with documents which, when opened, transmit a signal with information that may include the source of the signal and the time the document was opened.

It is also a goal of the present invention to allow linking multiple independent documents that are syntactically or semantically similar by analyzing their content, possibly in a privacy preserving manner, using statistical representations of that content.

Numerous variations may be practiced in the preferred embodiment.

BRIEF DESCRIPTION OF THE DRAWINGS

A further understanding of the invention can be obtained by reference to embodiments set forth in the illustrations of the accompanying drawings. Although the illustrated embodiments are merely exemplary of systems, methods, and apparatuses for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended hereto or as subsequently amended, but merely to clarify and exemplify the invention.

DETAILED DESCRIPTION OF THE INVENTION

Figure 1:
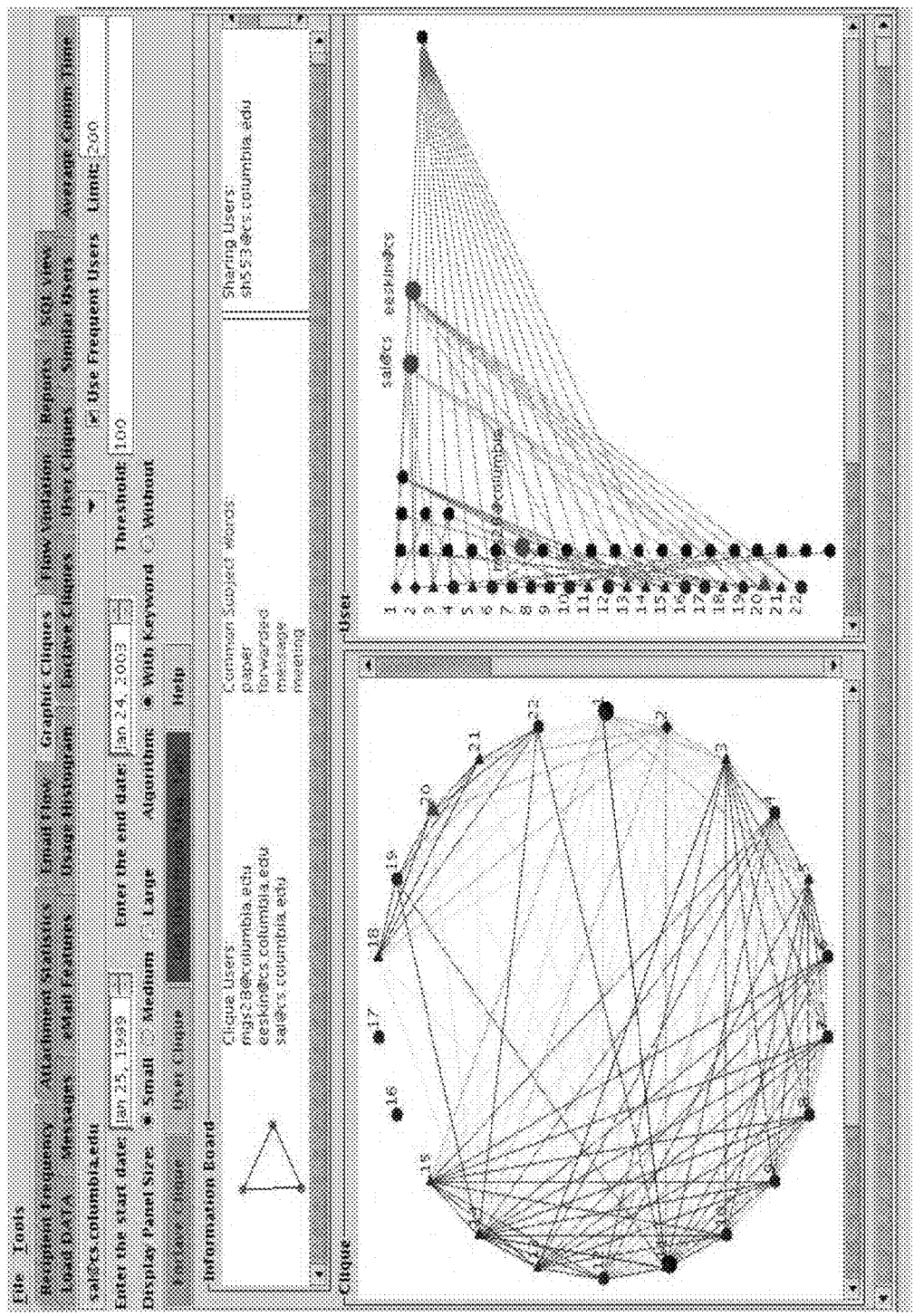
FIG. 1 depicts a screen shot of Email Mining Toolkit visualizations of user cliques.

The invention may be understood more readily by reference to the following detailed descriptions of preferred embodiments of the invention. However, techniques, systems, and operating structures in accordance with the invention may be embodied in a wide variety of forms and modes, some of which may be quite different from those in the disclosed embodiments. Consequently, the specific structural and functional details disclosed herein are merely representative, yet in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

The present invention may include methods to characterize content by, for example, using one-way data structures including a Bloom filter representation of the n-gram (byte sequence or natural language words) content of documents. Network analysis techniques may be applied to model a set of documents and content flows between users and to identify related documents, as well as "abnormal" or suspicious traffic between sources and destination that would be subjected to further analysis. Existing document management systems typically employ encryption of documents to protect and secure document content.

The entire life cycle of a document may be viewed as a flow, documents may be defined at incredibly fine levels such that individual clipboard objects are each documents unto themselves, initial documents may be linked to derivative versions, documents composed of many sources are linked to each source, and rigorous similarity analysis may be performed to identify similar documents even if linkages were not made explicitly within the software. The initial document may be referred to as the InitDocument, a logical identifier linked to all derivative document identifiers.

The present invention may include using Bloom filters storing mixtures of grams and utilizing available document analysis technology to reveal the structural components of documents. This approach has two particular advantages: speed in representing arbitrary mixtures of higher-order n-gram content of a document in a one-way set data structure, and mitigation against potential significant error in measuring similarity by utilizing document structure information. The approach need not capture frequency information of the grams, nor is there a need to pad grams to a fixed size required for Rabin fingerprinting.

Structure and content may both be used in comparing documents. Each document may be first "parsed" into its constituent object types, which are represented by a distinct Bloom filter. The similarity of documents may be computed on the basis of the overlap of "similar" components, including their type and the similarity of their content, by comparing their respective Bloom filters.

The invention disclosed herein may further consider the flow of documents. For example, the search for similar documents may be limited to only those documents consumed or produced by specific and easily discernible endpoints in a communication event, such as end user email accounts if the documents appear in email messages.

The document comparison technology of the present invention may be integrated with other existing technologies. For example, a designer may extend an existing technology called the Email Mining Toolkit (EMT) [4]. EMT is a data mining and profiling system applied to email data to detect anomalous email behavior (violations of volume/velocity statistics, as well as unusual recipients of email that violate a user's typical social network). EMT may be regarded as an anomaly detector applied to an email audit stream. Another system called the Malicious Email Tracking (MET) system focuses on modeling the behavior of attachments, and attachment flows in email among participating sites either within an enclave or across sites within an enterprise. EMT contains a large collection of features that may be combined for various detection tasks as well as revealing significant information flows within a network of users. For example, FIG. 1 shows a screen shot of EMT's visualization of user cliques, highly connected users who exchange information with each other frequently.

The present invention makes substantial improvements over this prior work by, for example, employing detection functions for document flows, regardless of whether the monitored documents are transmitted via email, instant messaging, or from queries executed against a document repository. The document flow modeling of the present invention provides a fundamental capability to account for information flows throughout an organization, and social networks derived from these document flows may be computed and analyzed to discover anomalous communication behaviors within an organization. The entire life cycle of a document and its relationship to other documents may be analyzed; the history of a document through different versions, the authors who contributed to document portions and the identification of those portions that were created from other documents, all manifest as a document flow through time.

The present invention addresses existing core technical problems by providing efficient, scalable and accurate means to identify related and similar documents based upon their content and their structural characteristics. The structural characteristics may include file size, date created, author(s) of the document, and/or the document source(s). The present invention further provides efficient, scalable and accurate means to identify anomalous or suspicious access patterns. Prior solutions to the problem of identifying similar content among different documents have relied on expensive methods that use natural language processing and domain name, semantic analyses, or higher order n-gram analysis where grams are composed of words in a particular language. Such methods do not scale well to large sets of arbitrary documents. The task is more difficult when documents cannot be safely shared for correlation. Here, however, Bloom filters are proposed to facilitate correlation without sharing the documents themselves.

A preferred embodiment of the present invention uses N-gram analysis as a language-independent statistical characterization of texts [11]. N-gram analysis has been applied by researchers for information retrieval and analysis tasks. This methodology requires no parsing, interpretation, or emulation of the content. An n-gram is the sequence of n adjacent byte values or words in a stream of content, whether they are documents or content flows in network applications. A sliding window with width n may be passed over the whole content of a document, one byte at a time, and the frequency of each n-gram is computed. This (normalized) frequency count distribution represents a "statistical centroid" or model of the content flow and may be used to compare documents, or identify portions of documents related to other documents. The methods are not without substantial cost, however. As the size of the gram increases, the feature space grows exponentially. Hence, depending upon the size of the gram one is analyzing, the data used to estimate distributions quickly becomes statistically sparse.

The present invention may include a method for quickly and efficiently analyzing documents and content flows based upon modeling a mixture of n-grams without frequency counts. Bloom filters may be used to model content by storing all of the distinct n-grams observed in a document without counting the occurrences of the n-grams. This representation is computationally efficient, and preserves the privacy of the content that is analyzed and compared. It is cryptographically hard to recover a document's cleartext from the Bloom filter, and it is a particular cryptographic challenge without frequency or position information for each of the constituent bytes and byte sequences.

Figure 2:
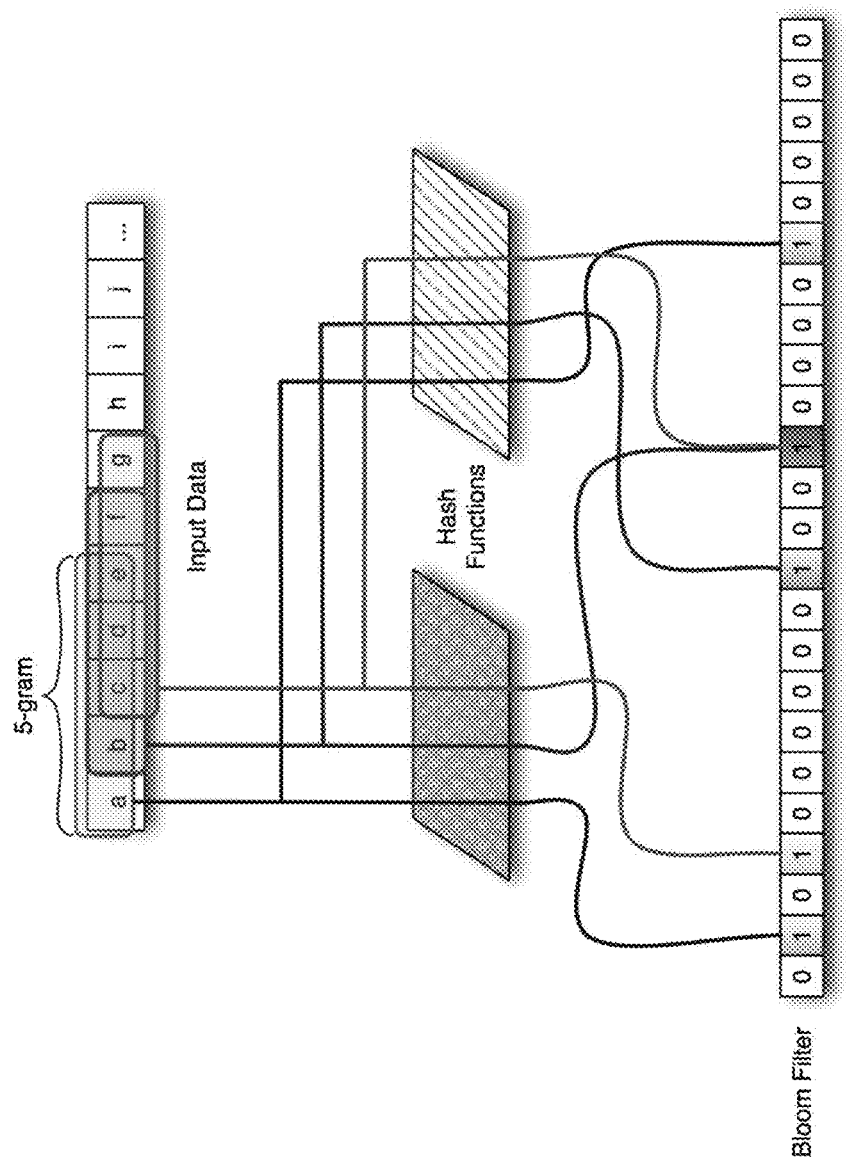
FIG. 2 depicts 5-gram scanning and storage in a two hash-function Bloom Filter.

A Bloom filter is essentially a bit array of m bits, where any individual bit i is set if the hash of an input value, mod m, is i. As with a hash table, a Bloom filter acts as a convenient one-way data structure that can contain many items, but generally is orders-of-magnitude smaller. FIG. 2 is an example of 5-gram scanning and storage in a two hash-function Bloom Filter. Operations on a Bloom filter are $O(1)$—it takes the same amount of time to look up a value regardless of whether the data structure includes a small number of items or many items—keeping computational overhead low. A Bloom filter contains no false negatives, but may contain false positives if collisions occur. The false positive rate can be optimized by changing the size of the bit array and by using multiple hash functions and requiring all of them to be set for an item to be verified as present in the Bloom filter. In the rare case where one hash function collides between two elements, it is highly unlikely a second or a third hash function would also simultaneously collide.

This method may be applied to the analysis of documents and general network content flows. The comparison of documents and content flows and the identification of similarities within this flow provides valuable information to identify sources and targets (e.g., email addresses, source IP addresses and user identities) that are related with respect to shared content in their communication. This computation, however, may be extremely expensive if not well designed. The present invention may be used to quickly scan over content and generate a descriptive Bloom filter of that content. The Bloom filters may then be directly compared. It should be evident that Bloom filters can be trivially merged via bitwise ORing and compared via bitwise ANDing. Hence, the similarity of two documents can be measured by simple operations executed over their Bloom filter representations. The number of bits in common, representing the set of (a mixture of) higher-order n-grams indicates the statistical similarity of their content. This methodology provides the opportunity to quickly identify commonalities between content flows in a network environment without expensive string operations such as longest-common subsequence, or advanced natural language processing analyses.

Document Flow Behavior Analysis: Probabilistic Anomaly Detection

The present invention may also be used to analyze document flow data. In accordance with the present invention, a system (300) connected to or including a proxy (390) (e.g., web proxy, reverse proxy, general purpose proxy on a network that intercepts traffic) may store document flow data in a database, represented in FIG. 3, as Doc Flows database (305). By applying a machine learning algorithm—depicted as DBA ML Engine (315) in FIG. 3—to learn models of typical document flows. The models may be used by any Anomaly Detector to detect suspicious document flow that may indicate a violation or risk.

A preferred embodiment of the present invention may employ a Probabilistic Anomaly Detector (PAD) that outputs a score suitable in a thresholding function to identify, and possibly alert, unusual document flows. A PAD algorithm is described in Eleazar Eskin, Salvatore J. Stolfo, "Anomaly Detection over Noisy Data using Learned Probability Distributions;" ICML00; Palo Alto, Calif., USA; 2000/07, the entire contents of which are incorporated herein by reference. A threshold function is represented as the Detection function (310) in FIG. 3.

PAD is relatively efficient in space and time and may build a very detailed model of document flows to identify unusual document flows indicative of a potential malicious exfiltration. The PAD algorithm may also train a normal probabilistic model in the presence of noise. Since probability density estimation is difficult to achieve with sparse data, PAD defines a set of consistency checks over the normal data. Each consistency check may be applied to an observed record. If the record fails a consistency check, the record may be labeled as anomalous.

Figure 3:
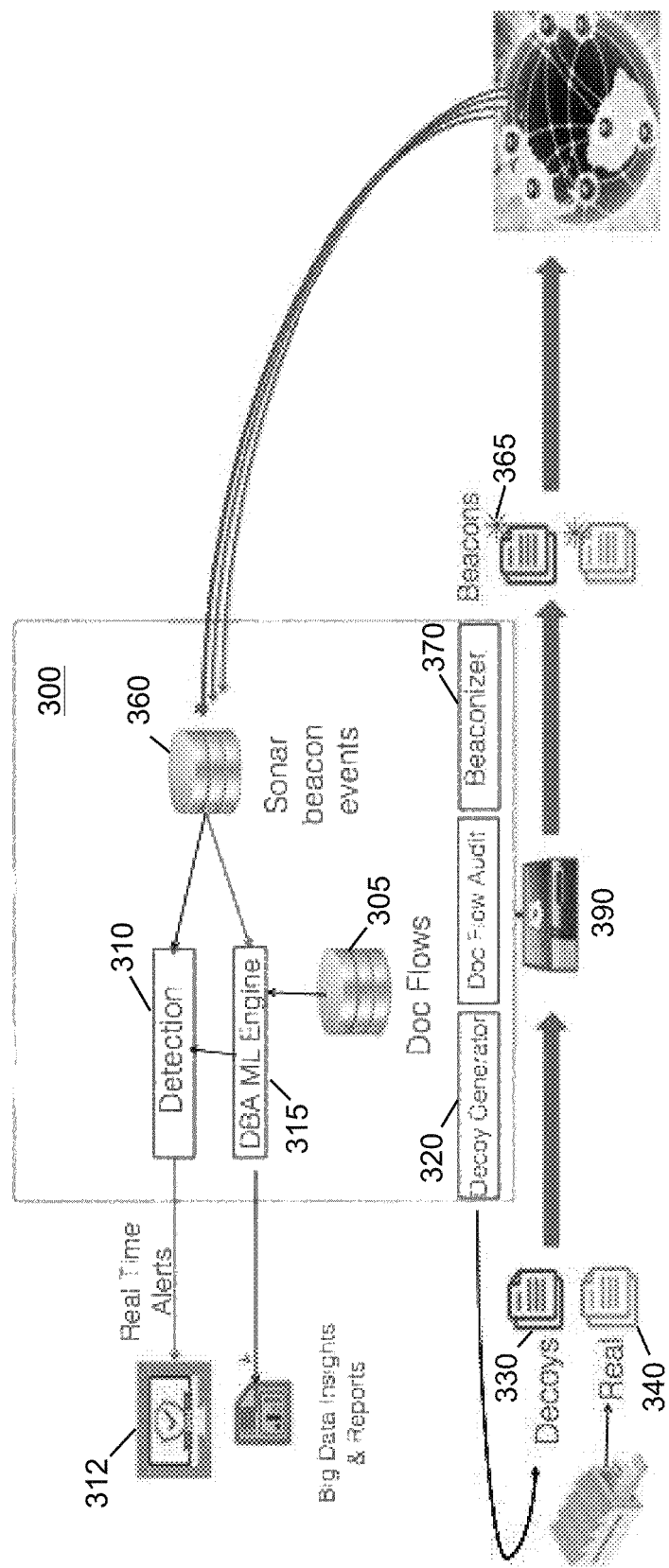
FIG. 3 depicts an architecture of a document flow monitoring and analysis infrastructure in accordance with the present invention.

Doc Flows database (305) depicted in FIG. 3 may contain a set of records describing a document flow observed in the monitoring infrastructure. Each record may consist of a set of features pertaining to that document flow, such as Source IP Address, Destination IP Address, Document Type, and so forth. The PAD model may be computed by observing "normal" document flows in an organization for some period of time called the training period.

The first kind of consistency check performed by PAD may evaluate whether or not a single feature value of an observed document flow is consistent with observed values of that feature in the normal data set generated during a training period. This type of consistency check may be referred to as a first order consistency check. PAD also may allow modeling the likelihood of a parameter conditioned on prior parameters. The sequence of recent sequential parameters may represent a more consistent and regular set of data characterizing the environment more accurately than a simple first order probabilistic model.

The second kind of consistency check performed by PAD may handle pairs of features. For each pair of features, the conditional probability of a feature value given another prior feature value, but not necessarily adjacent to the most recent issued command, may be considered. These consistency checks may be referred to as second order consistency checks. These likelihoods may be denoted as P(Xi|Xj) Note that for each value of Xj there is a different probability distribution over Xi.

If the likelihood of any of the consistency checks is below a threshold, the record may be labeled as anomalous. PAD is designed to estimate all such consistency checks, some of which may never generate an anomaly alert.

PAD is relatively efficient in space and time, even though it builds a very detailed model of the training data. This algorithm has been extensively tested using the windows registry and Linux commands and is applied in the present invention to document flow information.

What remains to be shown is how to compute the likelihoods for the first order (P (Xi)) and second order (P (Xi|Xj)) consistency checks. Note that from the normal data, we have a set of observed counts from a discrete alphabet for each of the consistency checks. Computing these likelihoods reduces to simply estimating a multinomial. In principal we can use the maximum likelihood estimate which just computes the ratio of the counts of a particular element to the total counts. However, the maximum likelihood estimate is biased when there is relatively small amounts of data. When estimating sparse data, this is the case. We can smooth this distribution by adding virtual counts to every possible element, thereby giving non-zero probability mass to yet unseen elements which may appear in the future. This is equivalent to using a Dirichlet estimator. For anomaly detection it is critical to take into account how likely we are to observe an unobserved element. Intuitively, if we have seen many different elements, we are more likely to see unobserved elements as opposed to the case where we have seen very few elements. This intuition explains why PAD performs well as an anomaly detection algorithm that trains well even with noisy training data. To estimate our likelihoods we use an estimator which explicitly estimates the likelihood of observing a previously unobserved element. The estimator gives the following prediction for element i $P(X=i)=(a+Ni)/[C*(k0a+N)]$ if element $i$ was observed $P(X=i)=(1/L-k0)]*(1-C)$ if element $i$ was not previously observed a is a prior count for each element
Ni is the number of times i was observed
N is the total number of observations
k0 is the number of different elements observed
L is the total number of possible elements or the alphabet size (eg., the total number of possibly IP addresses).

The scaling factor C takes into account how likely it is to observe a previously observed element versus an unobserved element. Intuitively, C is computed by estimating the ratio of "never before seen" elements to the number of seen elements over the training period.

Decoy Documents

The invention seeks to detect data loss and suspicious document flows in an organization by modeling typical document flows and abnormal or unusual document flows. These abnormal flows may be theft of documents exfiltrated from an organization. As in any inferential process, errors may occur, including false positive alerts indicating a theft when one has not occurred. The invention optionally provides for immediate and accurate detection of document theft by employing deceptive decoy documents.

Decoy Generator block (320) in FIG. 3 depicts an automated means of generating believable but entirely bogus documents that are planted as a "trap based" defensive mechanism. These decoy documents (330) may be distributed throughout an organization in various locations where real files and documents (340) are stored, including endpoint filesystems, cloud based storage servers, and any other file sharing distributed systems. Decoy documents (330) may also be stored in a source directory reserved exclusively for decoy documents (330). The decoy documents may be ordinary looking documents with embedded watermarks making them recognizable by Detection function (310) as a decoy. Detection function (310) may generate an alert (312) when a decoy document is sensed in a document flow, and/or when a decoy document is accessed from a particular source directory. Detection function (310) may also implement alerting functions based on inputs from the Doc Flows database (305), DMA ML Engine (315), and/or the Sonar Beacon Events database (360).

Beacons

A beacon (365) is an object embedded in a document that may survive editing and copying, and may signal home when the document is opened. When a beaconized document (a document containing an embedded beacon) is opened, a beacon signal event may be generated and recorded in a database. The signal event may include, for example, (1) Name of the data origin (the document name); (2) the email/domain of the owner of the beacon; (3) the IP address where the beacon was created; (4) the location where the document was placed; (5) the IP address of the (remote) computer where the beacon was opened including geolocation, ISP name, country level information, city level information, ISP and corporate relation to IP; (6) the email/domain of the remote user (optional) may be gathered for some beacons implementation; and/or (7) time of event.

Figure 4:
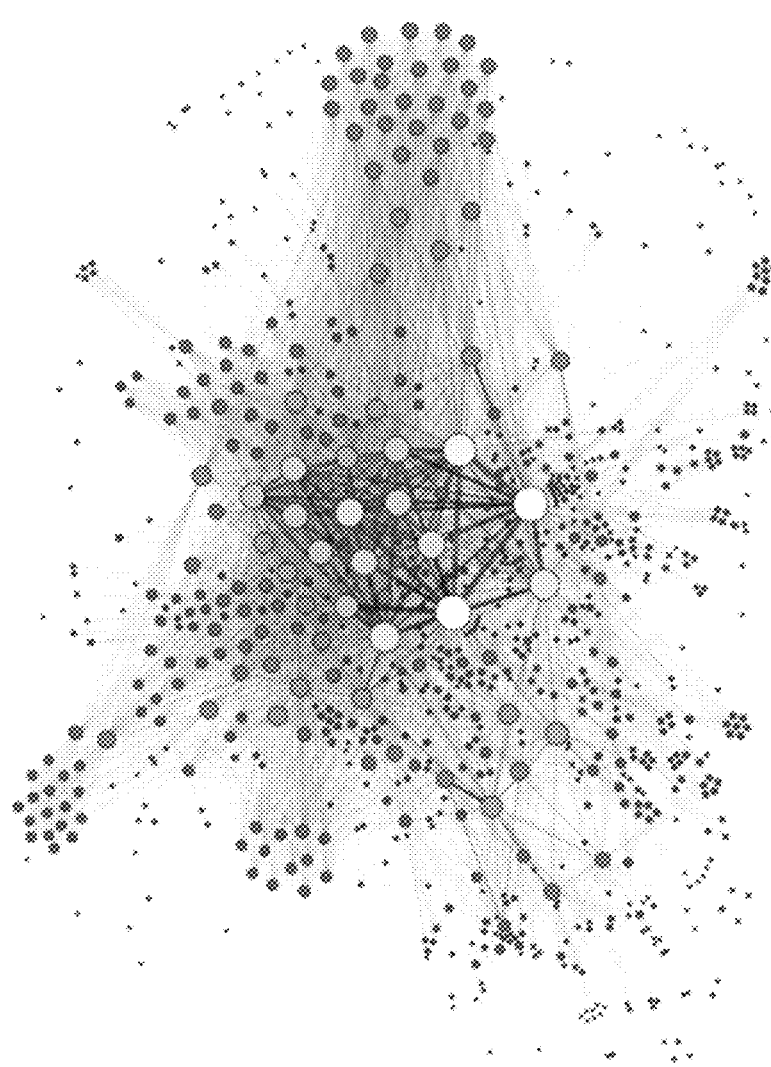
FIG. 4 depicts a document flow graph.

Beacons may be used to track data flow within and outside an organization. Beacon data may be acquired, for example, from endpoints that render beaconized documents. Download of beaconized document from cloud storage providers, documents opened, and/or documents forwarded may also be recorded as beacon events. The combination of those two sources may provide a document flow data set that may reveal where cloud-based documents flow, from endpoint to endpoint, after they are downloaded. This information may form the core of a document flow and may be visualized as a node in a graph, linked by IP addresses where each edge represents the flow of a beaconized document from a source IP address (the IP where the document was placed) to a sink (remote) IP address. This simple view, an example of which is depicted in FIG. 4, may suggests a number of important graph metrics, such as prestige centrality (rendered as the size of a node), can be computed for the IP address where beaconized documents signaled from document flow data. The graph may be overlaid on a physical map, providing a geolocation of document flows reminiscent of social media graphs and network topology graphs.

Beacons may provide real-time alerts of data loss, as well as forensic details that may pinpoint the source of exfiltration and allow immediate action against the exfiltration to be taken. Beaconizer block (370) depicted in FIG. 3 represents a program component that manages Beacon generation and insertion into documents. When an ordinary document is rendered by a common document processor, such as Microsoft Office or Adobe Reader, a signal may be sent to a network server that records information about the host computer that created and/or opened the document. Standard network protocols and features of standard document processing applications may be used to generate network signals that may be received and stored in the Sonar Beacon Events database (360). Beacon events may be input to Detection function (310). Detection function (310) may immediately report a security violation if the source of the Beacon event is, for example, an IP address outside a prescribed range, or other features of the document that deem the event to be a risk or a violation. It may be advantageous to correlate document flow information with Beacon events. Document flow analysis may identify an unusual document flow, but such unusual document flow may not constitute a security violations. There is potential for false positives in the detection output. Accordingly, it is desirable to filter noise and/or hone in on specific events that are clear indicators of data loss. Beacon events correlated with Document Flow information may provide a means of honing in on risky document flows.

The input to DBA ML Engine (315) includes data from the Sonar Beacon Events database (360) to learn (temporal) models of document movement including documents flowing through the internet external to the organization. The same analyses performed in the EMT system depicted in FIG. 1 may be applied to learn groups of IP addresses, or hosts that frequently exchange documents from which document flow information may be inferred. These external document flows are learned and may be subjected to the same anomaly detection function incorporated in the DBA ML Engine.

REFERENCES

[1] Getoor, Lise and Chris Diehl. Link Mining: A Survey, SIGKDD Explorations, 7 (2), 2005
[2] Duncan J. Watts. Networks, dynamics, and the small-world phenomenon. American Journal of Sociology, 105: 493-527, 1999.
[3] Wu, Fang and Bernardo A. Huberman, Discovering Communities in Linear Time: a Physics Approach, Euro. Phys. J. B, 38: 331-338 (2003).
[4] Salvatore J. Stolfo, Wei-Jen Li, Shlomo Hershkop, Ke Wang, Chia-Wei Hu, Olivier Nimeskern, "Detecting Viral Propagations Using Email Behavior Profiles" ACM Transactions on Internet Technology (TOIT), May 2004.
[5] Culotta, A., Bekkerman, R. and McCallum, A. Extracting Social Networks and Contact Information from Email and the Web. First Conference on Email and Anti-Spam (CEAS), Mountain View Calif., 2004.
[6] Boyd D. and Potter, J. Social Network Fragments: an interactive tool for exploring digital social connections. SIGGRAPH, San Diego Calif., 2003
[7] Bloom, B. H., Space/time trade-offs in Hash Coding with Allowable Errors. Communications of the ACM, 1970. 13(7): p. 422-426.
[8] Naor, M. and M. Yung. Universal One-Way Hash Functions and their Cryptographic Applications. in ACM Symposium on Theory of Computing. 1989. Seattle, Wash.
[9] Dharmapurikar, S., et al. Deep Packet Inspection using Parallel Bloom Filters. in IEEE Symposium on High Performance Interconnects (HOTI). 2003.
[10] Cavnar, Using an N-Gram-based document representation with a vector processing retrieval model, NIST special publication, Trec 3, 1995.
[11] M. Damashek, Gauging Similarity With n-grams: Language Independent Categorization of Text. In Science, 267(5199), pp. 843-848, 1995.
[12] Andrei Broder. On the resemblance and containment of documents, In Compression and Complexity of Sequences (SEQUENCES'97), pages 21-29. IEEE Computer Society, 1998.
[13] M. O. Rabin, Fingerprinting by random polynomials, Harvard University Technical Report, TR-15-81, 1981.

What is claimed is:

1. A method of using document flows to identify suspicious exfiltration, comprising:
    intercepting by a proxy device one or more document flows between devices in two separate network domains over a data network
    storing document flow data in a database,
    performing a first consistency check by evaluating whether or not a single feature value of an observed document flow is consistent with observed values of that feature in the normal data set generated during a training period;
    receiving a first data set including characteristics of a first plurality of documents;
    generating a network threshold from the first data set using a machine learning algorithm;
    generating a threshold function using the network threshold, wherein the threshold function receives as input data corresponding to a document characteristic and outputs a probability of whether the document characteristic is consistent with the characteristics of the first plurality of documents;
    receiving a first test characteristic of a document;
    inputting the test characteristic to the threshold function to generate a value indicating the extent to which the test characteristic matches the characteristics in the first data set;
    performing a second consistency check by, for at least one pair of distinct features, determining the conditional probability of a feature value given another prior feature value;
    receiving a second and third test characteristic;
    determining the conditional probability of the second test characteristic given the third test characteristic; and
    and alerting a network user operating one or more devices within one or more domains when an unusual document flow has occurred indicating malicious characteristics within one or more documents;
    wherein a document analysis and consistency check is performed on encrypted documents without requiring decryption to perform the consistency check.

* * * * *